Oct. 7, 1930.  J. O. ROBERTS  1,777,936
EXTRACTOR
Filed Jan. 24, 1928
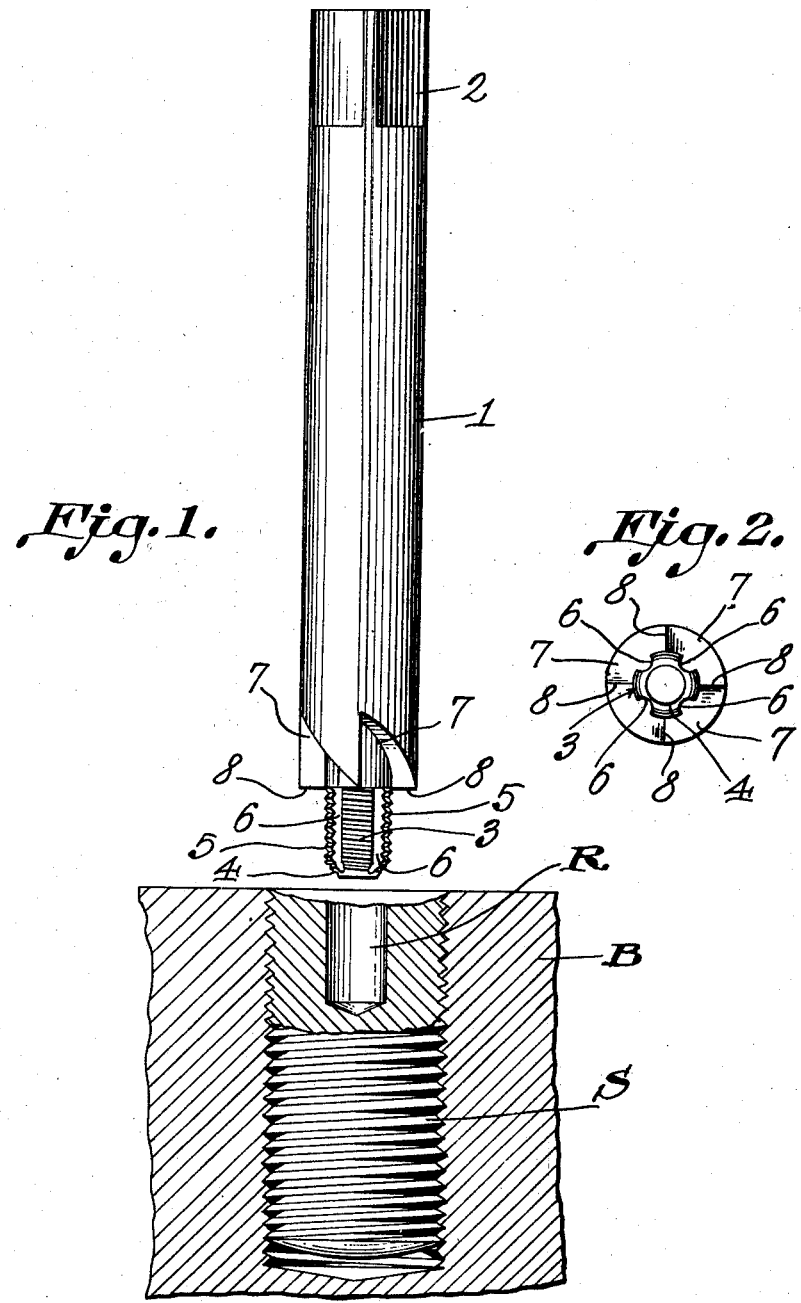
Julius O. Roberts
Inventor
By C. A. Snow & Co.
Attorneys Patented Oct. 7, 1930

1,777,936

UNITED STATES PATENT OFFICE

JULIUS O. ROBERTS, OF BENTONVILLE, ARKANSAS

EXTRACTOR

Application filed January 24, 1928. Serial No. 249,186.

This invention relates to a tool for extracting broken screws, threaded pipes and other screw-threaded devices from bores in which they are seated and from which they cannot be removed by the usual means.

It is an object of the invention to provide a tool of this character which will positively grip the object to be extracted so that, by turning the tool in one direction, the said object will be unscrewed and thus removed readily.

A further object is to provide an extracting tool the gripping action of which increases in proporton to the force exerted during the application of the tool to the threaded object to be removed.

With the foregoing and other objects in view which will appear as the description proceeds, the invention resides in the combination and arrangement of parts and in the details of construction hereinafter described and claimed, it being understood that changes in the precise embodiment of the invention herein disclosed may be made without departing from the spirit of the invention.

In the accompanying drawings the preferred form of the invention has been shown.

In said drawings,

Figure 1 is an elevation of the tool, the same being shown in position immediately prior to insertion into a screw about to be withdrawn from a structure in which it has been broken.

Figure 2 is an end view of the tool.

Referring to the figures by characters of reference 1 designates a shank of any desired shape and proportions which can be formed with a suitable head 2 at one end although this is not essential. The other end of the shank has a reduced cylindrical extension 3 the free end of which is slightly tapered as shown at 4, it being understood that the extent of this taper may be varied. A screw thread is cut into the extension 3 as shown at 5 and is intersected by longitudinal grooves 6 whereby the ends of the threads thus produced form cutting elements. Usually the extension 3 is to be formed with a left hand thread but where the tool is to be employed for removing an object having a left hand thread, the thread on the extension 3 will be right hand.

Formed in the shank 1 at that end from which the extension 3 projects, are a desired number of notches or recesses 7 forming cutting edges 8 which extend radially of the shank and are so designed as to cut in the direction in which the tool is rotated while being applied.

Should it be desired to remove a threaded object which has broken off in a structure the procedure necessary to remove the object would depend on the nature of the object. Should it be a solid screw S which has broken off in a metal block B or the like, it would first be necessary to drill a recess R in the screw, the diameter of this recess being slightly less than the diameter of the extension 3. Said extension would then be placed with its tapered end 4 in the outer end of the recess and by forcing the tool longitudinally and at the same time rotating it, it will work into the recess R, cutting a thread therein which will engage the thread on the extension. Thus the radial cutting or biting edges 8 on the shank 1 will be fed gradually against the exposed end of the screw S and as soon as this biting action takes place the screw will become tightly anchored to the tool. This will result in unscrewing the screw during further rotation of the tool in the same direction so that the screw can thus be removed readily.

Should it be desired to remove a broken piece of threaded pipe, it would not be necessary to form the bore. Instead a tool would be used having an extension 3 which will feed properly into the pipe to cause the biting edges 8 to engage and properly grip the end of the pipe.

This tool can be cheaply made and will be found of great utility where it is desired to remove broken screw-threaded parts from those structures in which they are seated.

It is also advantageous because it will not expand the object being removed.

What is claimed is:

A tool for extracting an exteriorly screw threaded object from a threaded bore including a shank, an extension at one end thereof having a tapered portion insertable into a bore in the object to be unscrewed, means on the extension for cutting a screw-thread in the wall of said bore pitched oppositely to the exterior thread on the object and for feeding the tool toward said object, and means on the shank for biting into said object at the completion of the thread cutting operation of the extension, thereby to couple the threaded object to the shank and unscrew said object during continued rotation of the shank in the same direction, the pitch of the thread cutting means being such as to cause the tool to bite into the engaged object with increasing pressure proportioned to the resistance encountered in unscrewing the object.

In testimony that I claim the foregoing as my own, I have hereto affixed my signature.

JULIUS O. ROBERTS.